Jan. 21, 1941.   W. B. PAYNE   2,229,339
MOTOR DRIVE FOR CHECK WRITERS AND THE LIKE
Filed June 27, 1938   5 Sheets-Sheet 1
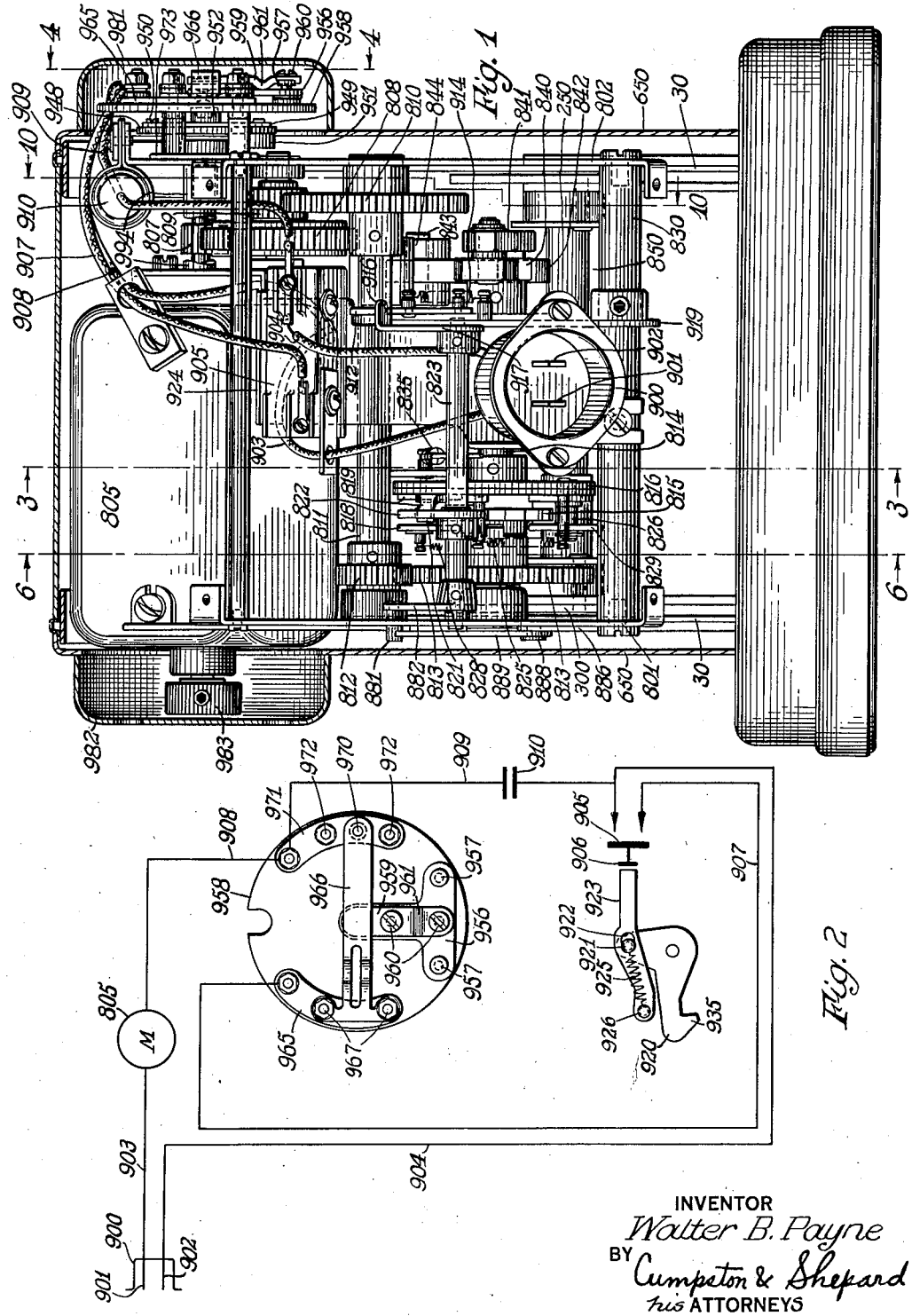
INVENTOR
*Walter B. Payne*
BY
*Cumpston & Shepard*
his ATTORNEYS

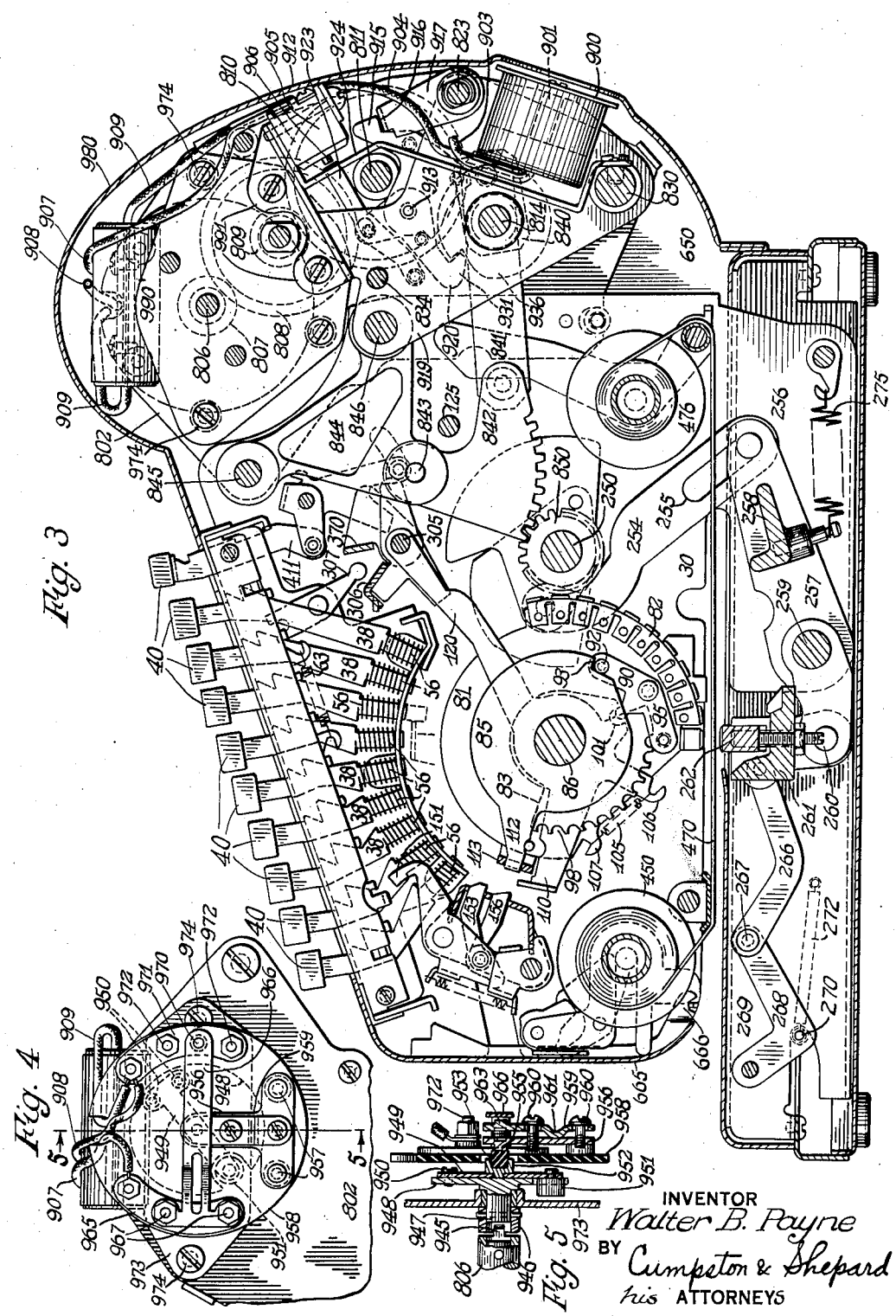

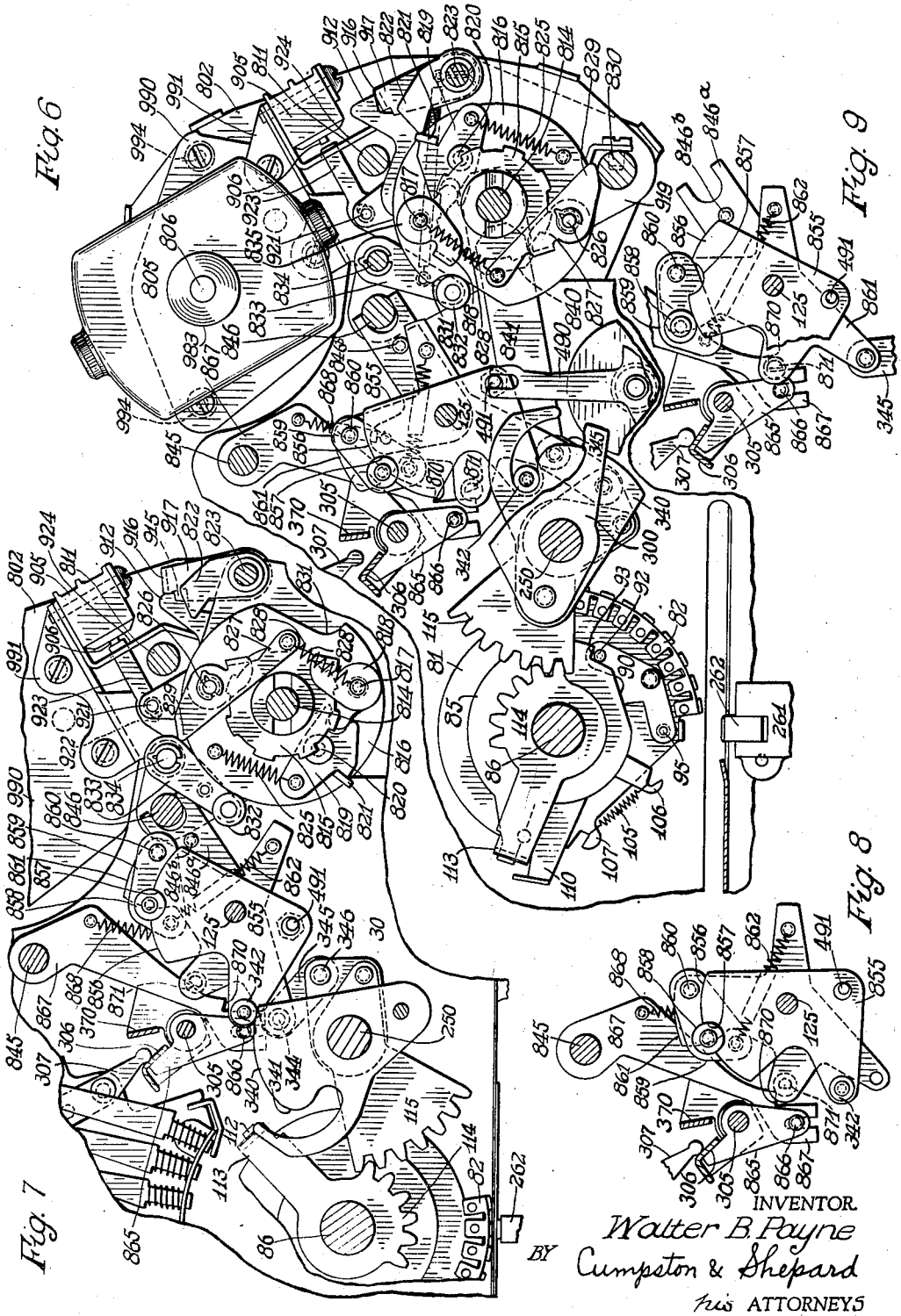

Jan. 21, 1941.  W. B. PAYNE  2,229,339
MOTOR DRIVE FOR CHECK WRITERS AND THE LIKE
Filed June 27, 1938  5 Sheets-Sheet 4
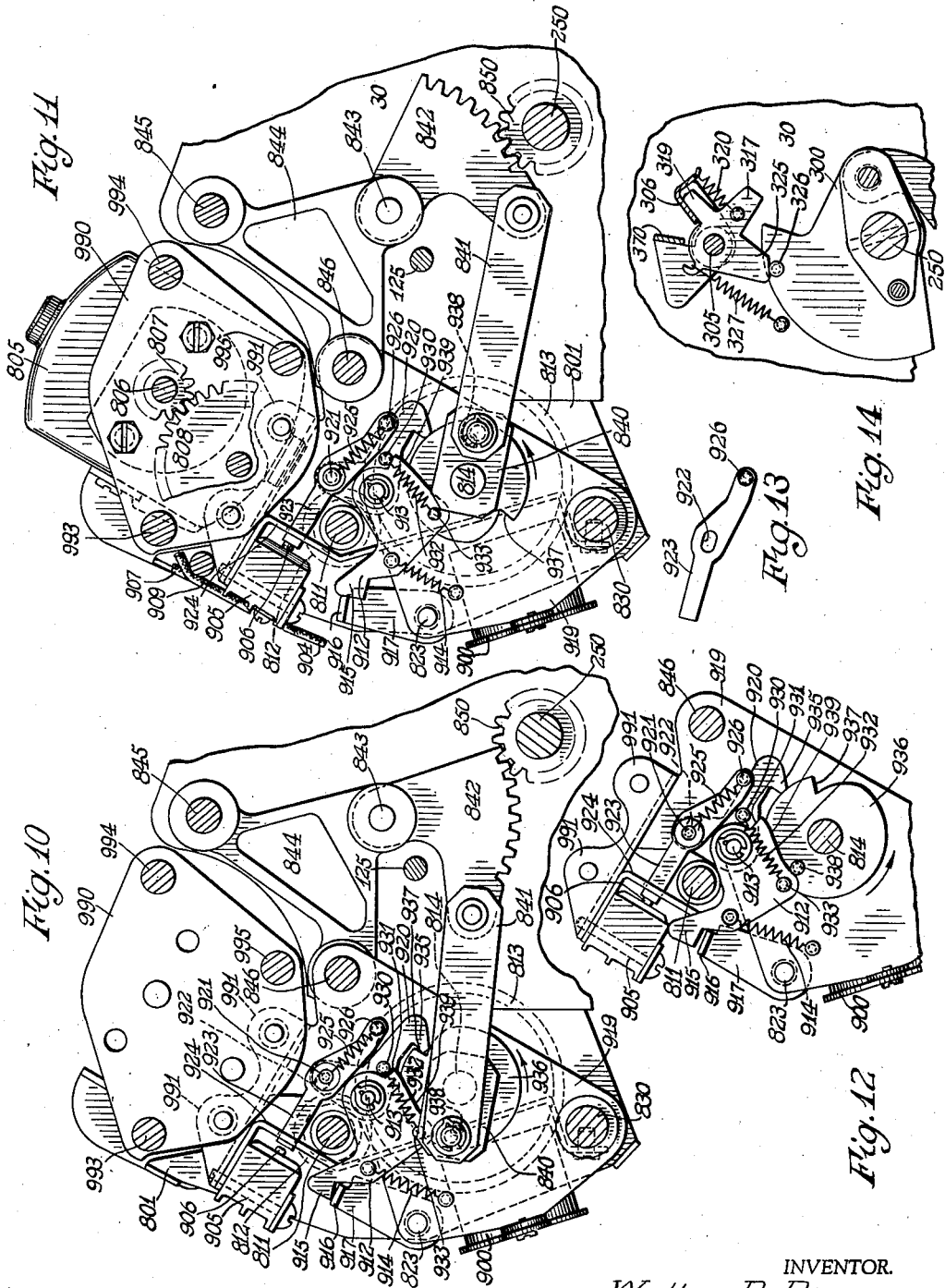
INVENTOR.
Walter B. Payne
BY Cumpston & Shepard
his ATTORNEYS

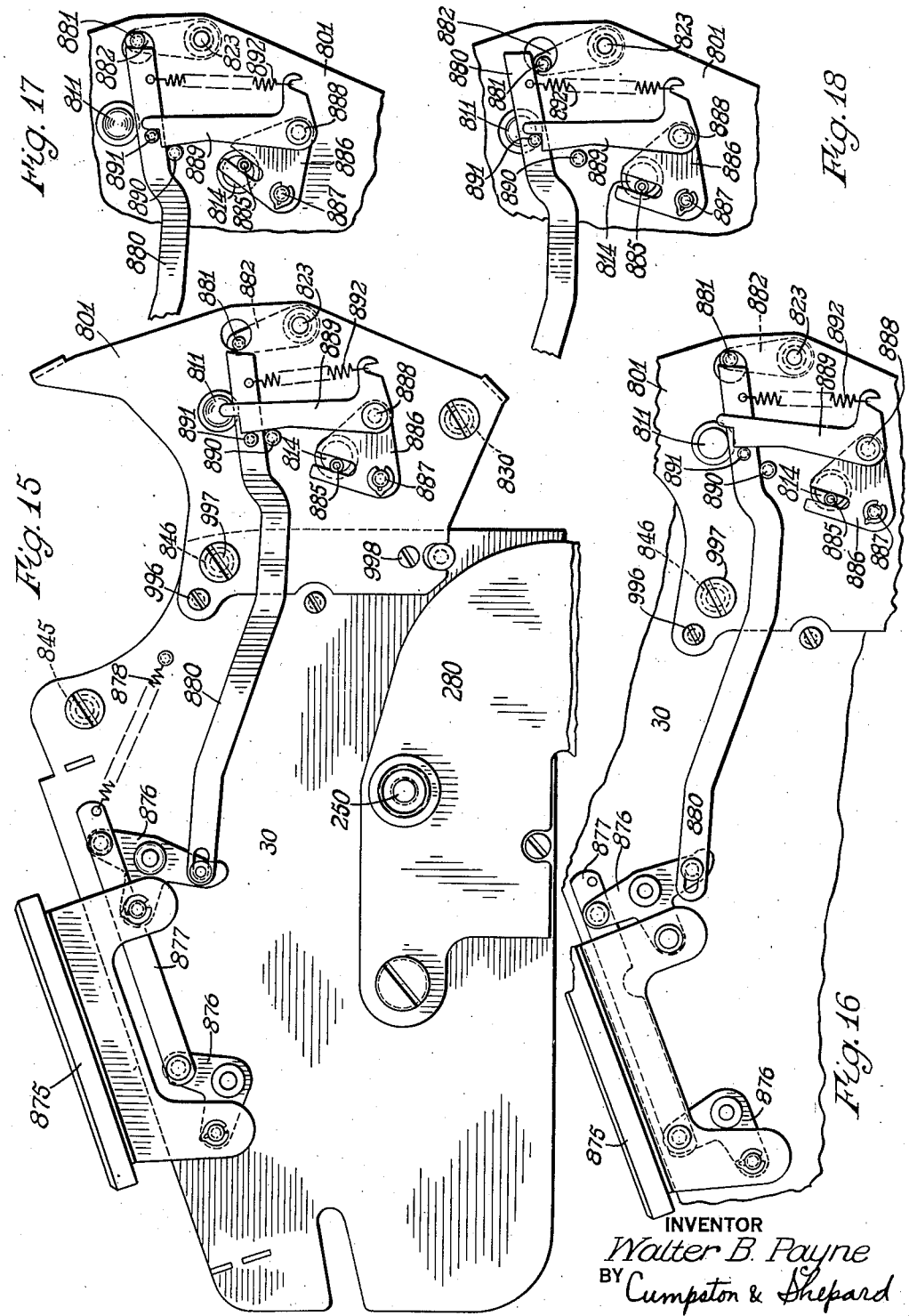

Patented Jan. 21, 1941

2,229,339

UNITED STATES PATENT OFFICE 2,229,339

MOTOR DRIVE FOR CHECK WRITERS AND THE LIKE

Walter B. Payne, Rochester, N. Y., assignor to The Todd Company, Inc., Rochester, N. Y., a corporation of New York Application June 27, 1938, Serial No. 215,964

9 Claims. (Cl. 192—.02)

This invention relates to driving mechanism for printing machines, such as check writers, signature imprinting machines, numbering or dating machines, endorsing machines, and similar machines. An object of the invention is the provision of simplified and improved driving means for such machines, relatively quiet in operation and of sturdy and efficient character.

Another object is the provision of a motor drive so constructed as to be adapted to be built into a known existing type of printing machine with relatively little change in the machine.

A further object is the provision of a motor drive of such character that blocking of operation of certain parts of the machine to which it is attached will not cause breakage or damage of the parts, but will permit full operation of the motor drive through its complete cycle, without forcing the parts which are blocked.

To these and other ends the invention resides in certain improvements and combinations of parts, all as will be hereinafter more fully described, the novel features being pointed out in the claims at the end of the specification.

In the drawings:

Fig. 1 is a rear view of a machine equipped with a preferred form of motor drive of the present invention, with parts of the casing removed to show the parts within the drive being shown in connection with a check writing machine for purposes of illustration;

Fig. 2 is a diagrammatic view of the wiring connections for the electric motor, illustrating details of certain associated control parts;

Fig. 3 is a vertical section taken longitudinally through the check writing machine and motor drive, substantially on the line 3—3 of Fig. 1;

Fig. 4 is a face view of the centrifugal governor used for controlling the motor, taken substantially on the line 4—4 of Fig. 1.

Fig. 5 is a section through the same substantially one the line 5—5 of Fig. 4;

Fig. 6 is a fragmentary vertical longitudinal section through the machine, substantially on the line 6—6 of Fig. 1, illustrating the parts in normal rest position;

Fig. 7 is a similar view with the parts at an intermediate position in the cycle of operation;

Fig. 8 is a similar view of a portion of the mechanism with the parts in still another position;

Fig. 9 is a similar view with the parts in still another position, illustrating blocking of one of the parts and consequent interruption of the drive to prevent damage to the blocked parts;

Fig. 10 is a fragmentary vertical section taken substantially on the line 10—10 of Fig. 1, with the parts in normal rest position;

Fig. 11 is a similar view with the parts at an intermediate point of the cycle of operation;

Fig. 12 is a similar view with the parts advanced somewhat further than in Fig. 11;

Fig. 13 is a view of a switch control member shown in Figs. 10 to 12, detached from the other parts;

Fig. 14 is a fragmentary vertical section taken longitudinally through part of the machine;

Fig. 15 is an elevational view of the right hand side of the machine with the casing removed to show the parts immediately within the casing, and with certain parts omitted, illustrating the motor drive trip mechanism in normal rest position;

Fig. 16 is a similar view illustrating the motor drive trip mechanism in tripped position;

Fig. 17 is a fragmentary view of a portion of the mechanism shown in Figs. 15 and 16, showing the trip throw-out mechanism in a position somewhat further advanced than that shown in Fig. 16, and Fig. 18 is a similar view showing the trip throw-out mechanism still further advanced with the trip disengaged so that the motor drive will stop at the end of one cycle of operation, notwithstanding continued pressure on the trip bar.

The same reference numerals throughout the several views indicate the same parts.

The illustrative embodiment of motor drive of the present invention is here disclosed, for the sake of example, in connection with a check writer of the kind disclosed in United States Patent 2,092,852, granted September 14, 1937, for an invention of Walter B. Payne. This is merely a convenient example of one kind of printing machine with which this motor drive may be employed, and it may also be used with many different types of printing machines and similar machines, particularly machines for imprinting various data (amounts, signatures, dates, numbers, etc.) upon checks or the like, so that the disclosure of this motor drive in connection with the particular check writing machine above mentioned is not intended as a limitation upon the usefulness of the motor drive. Among the many other kinds of machines with which the present motor drive mechanism is adapted to be employed, may be mentioned the signature imprinting machine disclosed in my copending application for United States patent on Printing apparatus, Serial No. 202,261, filed April 15, 1938.

To avoid unnecessary repetition of the construction and operation of said check writing machine in the present specification, reference is made to said Payne patent for a disclosure of the construction and operation of the check writer. Except for the changes or modifications hereafter mentioned, the check writer herein referred to as an example may be constructed substantially the same as the check writer disclosed in said Payne patent, and the parts thereof are here given the same reference numerals applied to them in said Payne patent, but without individually describing most of those parts in the present specification, reference being made to the specification of said Payne patent for a description thereof. The reference numerals below 800 in the present specification and drawings all refer to parts described in said Payne patent which, in general, are not described here. The reference numerals above 800 are used for parts of the motor drive of the present invention and for such parts of the check writer as have been altered from the construction shown in said Payne patent.

To the side plates 30 of the check writer are secured rearwardly extending plates 801 at the right side and 802 at the left side (Figs. 1, 3, and 15) constituting the main side frames of the motor drive unit. Most of the motor drive mechanism is mounted between or supported from these side plates. Such mechanism includes an electric motor 805, on the armature shaft 806 of which is a pinion 807 (Figs. 1 and 3) driving a gear 808 rotatable on a stub shaft, which gear is secured to or integral with a pinion 809 driving another gear 810 fixed to the left end of a shaft 811. This shaft, near its right end, carries a pinion 812 meshing with a gear 813 (Figs. 1 and 10) rotatable on a shaft 814. Secured to the gear 813 to rotate therewith on the shaft is a clutch disk 815 having a toothed periphery (Figs. 1, 6, and 7).

A second clutch disk 816 is pinned to the shaft 814, and on a lateral stud 817 carried by this disk 816 is a clutch dog 818 having an ear adapted to engage the teeth of the driving disk 815 when the dog is in one position. Another ear of the clutch dog engages a recess in an operating dog 819 pivoted on another lateral stud 820 on the disk 816. An ear 821 on this dog 819 lies in the plane of a release lever 822 pinned to a control shaft 823. When the parts are in the position shown in Fig. 6, the end of the release lever 822 is in contact with the ear 821 of the dog 819 and holds this dog in such position that the other dog 818 is out of contact with the toothed driving disk 815. If the release arm 822 be swung away from the ear 821, as by turning the shaft 823 in a clockwise direction from the position shown in Fig. 6, then a spring 825, secured at one end to a pin on the disk 816 and at the other end to the dog 819, will swing this dog 819 in a clockwise direction about its pivot 820, which will swing the other dog 818 in a counter-clockwise direction about its pivot 817 and will move the end of the dog 818 into contact with the periphery of the toothed driving disk 815 so that it will engage in the next available notch thereof, thus establishing driving relation between the rotating disk 815 and the clutch disk 816.

The disk 816 carries another stud 826 on which is pivoted a backlash dog 827 carrying an ear for cooperation with the toothed disk 815. A spring 828 tends to swing the backlash dog 827 into engagement with the toothed disk 815. As the clutch completes a single revolution and comes around once more to its initial position, a tail 829 on the backlash dog comes into contact with a cross shaft 830, which moves the dog 827 in a counterclockwise direction about its pivot 826 and releases the dog from the toothed disk 815. At about this same time the ear 821 on the dog 819 abuts against the release arm 822, which throws the dog 819 in a counterclockwise direction about its pivot 820 and thus releases the dog 818 from the toothed disk 815, interrupting the driving relation. Also, at about the same time, a notch 831 in the periphery of the clutch disk 816 comes opposite a roller 832 on an arm 833 mounted for oscillation on the shaft 834, and attached to one end of a spring 835 which keeps the roller 832 pressed against the periphery of the disk 816, so that when the notch arrives at the roller the roller drops into the notch and resiliently holds the disk 816 in this normal rest position. The other end of the spring 835 is attached to a pin on the shaft 823 and tends constantly to turn this shaft in a counterclockwise direction when viewed as in Figs. 3 and 6.

The above described clutch is in general of the same construction and operates in general in the same way as the clutches disclosed in Figs. 8 and 9 of Payne Patent 2,071,139, granted February 16, 1937, and in Figs. 6 and 7 of Payne Patent 2,122,536, granted July 5, 1938.

When the clutch is engaged the rotation of the disk 815 drives the clutch disk 816 which, being pinned to the shaft 814, drives this shaft in a clockwise direction when viewed as in Figs. 3, 6, and 7. Secured to this shaft 814 near the left end thereof is a crank 840 (Figs. 10 and 11) to which is pivoted one end of a connecting rod 841. The other end thereof is pivoted to a gear segment 842 mounted to oscillate on the stub shaft 843 which is held by a generally triangular frame 844 mounted on the cross shafts 845 and 846 which extend between the side plates of the machine frame.

The gear segment 842 has teeth meshing with a pinion 850 pinned to what may be termed the main shaft 250 of the check writer unit (see Payne Patent 2,092,852 for details). A single revolution of the shaft 814, caused by a single actuation of the clutch, will thus cause one revolution of the crank 840, which will swing the gear segment 842 first forwardly and then rearwardly, oscillating the main shaft 250 first in a counterclockwise direction (Fig. 3) and then in a clockwise direction, in the same manner as though it were oscillated by the hand crank 251 of the Payne patent.

This oscillation of the main shaft 250 drives the other parts of the check writer in the manner disclosed in said Payne patent, except for the differences which will now be described. Since the main shaft is to be oscillated by the power of a motor rather than by a manual pull on a hand crank, it is desired to provide a releasable connection between the main shaft and certain of the parts operated thereby, so that if such parts should be prevented from moving in the intended manner, breakage or damage would not result. To this end, the operating cam 340, fixed to the shaft 250, operates on the cam follower roller 342 as in the Payne patent, but this follower roller, instead of being mounted directly on the lever 343, is in the present instance mounted on a special lever 855 (Figs. 6-8) rotatable on the shaft 125. This lever 855 has a portion of its periphery formed of arcuate shape concentric with the shaft 125, as indicated at 856, and at about the center of this arcuate portion there is a notch 857 (Fig. 9) in which is normally seated a roller 858 mounted on a stud on an arm 859 pivoted at 860 to a lever 861 which is also mounted for oscillation on the shaft 125 beside the lever 855. A spring 862, connected at one end to a stud on the lever 861 and at its other end to the arm 859, tends constantly to hold the roller 858 seated in the notch 857. Thus the two levers 855 and 861 are normally connected to oscillate in unison, but if unusual resistance to oscillation of the lever 861 should occur, the roller 858 may be forced out of the notch 857, against the tension of the spring 862, and may ride on the concentric periphery 856 of the lever 855 as the latter continues to turn, so that the lever 855 may complete its full cycle of oscillation without necessitating further oscillation of the lever 861, as shown in Fig. 9.

This lever 861 corresponds to the lever 343 of said Payne patent, and is connected by the link 345 to the gear segment 115 (see Figs. 6 and 7 of this application, and Fig. 4 of Payne patent) so that when the lever 861 is oscillated, this oscillates the gear segment 115 and sets up the printing types 82 to present at the printing line the numerals determined by the previously depressed keys 40, all as explained in said Payne patent.

The ribbon winding stud 491, however, mounted on the lever 343 in said Payne patent, is here mounted on the lever 855 rather than the lever 861, and it engages the forked upper end of the ribbon feeding lever 490 (Fig. 6 of this application, Fig. 7 of Payne patent) to feed the ribbon at each cycle of operation.

The cross shaft 305 carries the key locking bail 306 mounted for oscillation on the shaft to cooperate with the key bank levers 307 (Figs. 6 to 9) as described in said Payne patent. As in the patent, the bail 306 is operated by an arm 319 (Fig. 14) of a lever rotatable on the shaft 305, this lever having another arm 325 in position to cooperate with a lateral pin 326 on the disk 300 fixed to the main shaft 250. When the main shaft begins to move through its cycle of operation (in a counterclockwise direction in Figs. 3 and 6, or clockwise direction in Fig. 14) the pin 326 rides out from under the arm 325 and the spring 327 turns the member 319, 325 in a counterclockwise direction (Fig. 14) to throw the locking bail 306 rearwardly against the forward sides of the levers 307 (Fig. 7), one of which is provided for each bank of keys. In the present arrangement, the arm 317 connected to the arms 319 and 325 is cut off short and the hook 318 of the Payne patent is entirely omitted.

A lever 865 (Figs. 6 to 9) is rotatably mounted on the shaft 305 and has its upper end just in front of the bail 306. The lower end of the lever 865 carries a laterally projecting pin 866 extending into a slot in the lower end of a lever 867 rotatably mounted on the shaft 845. A spring 868 connected to this lever 867 tends constantly to move the lever in a clockwise direction about its shaft 845 when viewed as in Figs. 6 to 8, thus tending to swing the lower end of the lever leftwardly, which would swing the pin 866 leftwardly and swing the lever 865 clockwise to move the locking bail 306 against the lever 307. When the parts move back to initial normal or rest position at the end of a cycle of operation, the pin 326 (Fig. 14) on the disk 300 forcibly moves the tail 325 so that the spring 320 moves the locking bail 306 forwardly away from the levers 307, the spring 320 being stronger than the spring 868 which tends to move the locking bail rearwardly against the levers 307. This normal rest position of the parts is illustrated in Fig. 6 and in this position a shoulder 870 on the arm 867 lies in the path of movement of a stud 871 projecting laterally from the lever 861, in such position as to prevent the full range of upward movement of the stud 871.

At the beginning of the cycle of operation, if the levers 307 are in proper position, the springs 327 and 868 will move the locking bail 306 to its normal locked position (Figs. 7 and 8) and the lever 867 will be moved so that the shoulder 870 is out of the way of the stud 871 and will not interfere with the full cycle of movement of the lever 861, movement of which sets the type members 82 as well as performing other functions. If, however, one of the keys 40 is only partially rather than fully depressed, then its corresponding lever 307 will have its lower end somewhat forwardly of proper position, as explained in said Payne patent, and as indicated in Fig. 9 of the present application drawings. When any one of the levers 307 is in this forward position, then when the main shaft 250 begins to turn and the pin 326 rides out from under the arm 325, the spring 327 will be unable to move the bail 306 rearwardly to its proper position, for the bail will engage the displaced lever 307, which will stop rearward movement. Thus the bail 306 will be held in the position indicated in Fig. 9, which will prevent the lower end of the lever 867 from moving forwardly in the intended manner, and the shoulder 870 will remain alined with the stud 871. As the levers 855 and 861 turn during the early part of the cycle of operation, the stud 871 on the lever 861 will come into contact with the shoulder 870 (the pressure being in a general direction radially toward the shaft 845) and will prevent further movement of the lever 861, the lever 855 meanwhile completing its normal travel and causing the roller 858 to spring up out of its notch 857 and to ride on the arcuate periphery 856 of the lever 855. Thus, although the motor, the clutch mechanism, and the lever 855 all complete their normal cycle of operation, the lever 861 will not be forced to go through its cycle of operation but will be moved only until the stud 871 comes into contact with the shoulder 870, so that the printing types 82 will not be set to the printing line and no amount will be printed on the check inserted in the machine.

A stationary part 846a (Figs. 6 and 7) carries a laterally extending stud 846b which is engaged by a projecting arm of the lever 861 when the mechanism is in the normal position shown in Fig. 6. This stud 846b acts as a stop to prevent an unrestricted counterclockwise movement of the lever 861 about its pivot 125. As shown in Figs. 7 and 9, the stud 846b is also adapted to limit the clockwise rotation of the lever 855 about its pivot 125 during the cycle of operation of the machine.

From the shoulder 870 upwardly to a point opposite the top of the range of movement of the stud 871, the edge of the lever 867 which is toward the shaft 125 is formed arcuately substantially concentric with the shaft 125, when the lever is in the position shown in Figs. 7 and 8. When the stud 871 has passed upwardly beyond the shoulder 870 near the beginning of each cycle of operation, the stud, lying just to the rear of this arcuate edge of the lever 867, prevents the lever from moving rearwardly and thus prevents any of the keys 40 from being depressed, until near the end of the cycle, when the stud 871 returns to its normal position below the shoulder 870.

The arms 120 which hold the locking members 83 against rotation on the type shaft 86 in said Payne patent, are here connected directly to the shaft 305, instead of being connected to a floating shaft 121 as in the Payne patent.

The clutch release shaft 823 may be operated in any suitable manner to cause the motor drive to operate through the cycle. For instance, a trip bar 875 (Fig. 15) may be mounted near the right hand side of the machine on bell cranks 876, connected to each other by a link 877 so that the two bell cranks move in unison. A spring 878 tends constantly to elevate the trip bar 875 to its uppermost position. When it is depressed, this causes counterclockwise rotation of the bell cranks and rearward movement of a link 880 connected to the rearward one of the bell cranks. The rear end of this link 880 lies normally in line with a stud 881 projecting laterally from an arm 882 fixed to the clutch control shaft 823, so that a rearward thrust of the link 880 will contact with the stud 881 and turn the shaft 823 to move the release lever 822 away from the lug 821, engaging the clutch for one revolution.

To prevent the clutch from making more than one revolution at a time, even though the trip bar is held depressed, the right end of the shaft 814 is provided with an eccentric axially projecting pin 885 which engages a slot in a lever 886 pivoted on a stud 887 on the frame plate 801. Pivoted on this lever 886 at 888 is another lever 889, which lies just to the rear of a stud 890 projecting laterally from the frame plate 801 and a stud 891 projecting laterally from the link 880. A spring 892, connected both to the lever 889 and to the link 880, tends constantly to pull the rear end of the link downwardly and to move the upper end of the lever 889 forwardly.

The normal rest position of the parts is shown in Fig. 15. If the trip bar 875 be depressed, this will move the parts to the position shown in Fig. 16, and will turn the clutch control shaft 823 so that the clutch is engaged and the cycle of operation is started. As the shaft 814 turns during the cycle of operation, the eccentric pin 885 will move around in a clockwise direction, which will swing the lever 886 in a clockwise direction, depressing the pivot 888 and drawing the lever 889 downwardly until the upper end of the lever 889 snaps beneath the stud 891 on the link 880 (as shown in Fig. 17) if the trip bar 875 is still held depressed. Upon further rotation of the shaft 814, the effect of the pin 885 will be to move the lever 886 in a counterclockwise direction, raising the pivot 888 and the lever 889 so that the lever 889 shoves upwardly on the stud 891 and moves the rear end of the link 880 upwardly to a position above the stud 881 (Fig. 18) so that the spring 835 may restore the shaft 823 to its initial or normal rest position, notwithstanding continued pressure on the trip bar 875. The parts are so timed that this will occur before the end of one complete revolution of the clutch, so the release lever 822 will be restored to its position to release the clutch and stop the cycle of operation at the end of one complete revolution. Before the second cycle can be performed, it is necessary to release the trip bar 875 (which draws the rear end of the link 880 forwardly past the stud 881 so that it snaps down in front of the stud) and again depress the trip bar 875 to cause another operation.

From what has been said, it will be apparent that the motor drive will operate through one complete cycle each time that the trip bar 875 is depressed, whether the motor 805 is running continuously or whether it runs only during the cycle of operation. It is within the scope of the present invention to run the motor 805 continuously if desired, although it is preferable to have this motor run only during the cycle of operation to provide a smoother and less jerky start of the operating cycle, and to avoid the noise and vibration which would be caused if the motor ran also between operating cycles.

In the preferred form, the motor 805 is supplied with current from any suitable source, such as a flexible electric cord having a female plug received in the socket 900, which plug cooperates with and furnishes current to the male prongs 901 and 902 (Figs. 1 and 2). A wire 903 leads from the prong 901 to the motor 805. Another wire 904 leads from the prong 902 to the switch indicated in general at 905. This switch 905 is conveniently of the plunger type, being controlled by a plunger 906 which, when pressed in, closes the circuit and starts the motor, and when pressure is released, an associated spring thrusts the plunger outwardly again to open the switch. A wire 907 leads from the other side of the switch 905 to one side of a centrifugal governor switch, described in detail below, and another wire 908 leads from the other side of this centrifugal governor switch to the motor 805. Another wire 909 leads from the wire 904 to that side of the governor switch to which the wire 908 is connected, a condenser 910 being interposed in this wire 909.

For operating the switch 905, there is provided mechanism including a lever 912 (Figs. 10, 11, and 12) mounted to turn on a stud 913 fixed on a frame plate 919 of the machine. A coiled spring 914, fixed at one end to a stud on the frame plate 919 and at the other end to a stud on the lever 912, tends to turn the lever in a counterclockwise direction when viewed as in Figs. 10 to 12. A nose 915 on the lever lies in the plane of an ear 916 on an arm 917 fixed to the control shaft 823.

Pivotally mounted on the same stud 913 is a two-armed lever 920, one arm of which carries a laterally projecting stud 921 extending through a slot 922 (Fig. 13) of a plunger operating piece 923 the left hand or rearward end of which extends through and is guided in a hole in a fixed flange 924. The rear end of this piece 923 is in line with the switch operating plunger 906, so that when the piece 923 moves rearwardly, it presses against the plunger and closes the switch. A coiled spring 925 is secured at one end to the stud 921 and at the other end to a stud 926 on the forward or right hand end of the piece 923, to tend to move the piece 923 rearwardly as far as the length of the slot 922 will permit.

The two-armed lever 920 carries a stud 930 which overlies a shoulder 931 on the lever 912. A spring 932 is connected at one end to this stud 930 and at the other end to a stud 933 on the lever 912, and tends to hold the stud 930 against the shoulder 931. The lever 920 has a nose 935 lying in the plane of and adjacent the periphery of a disk 936 fixed to the shaft 814 to turn therewith. This disk has a notch 937 at one point in its periphery, so shaped that when the disk is rotating, the leading side of the notch is quite steep (substantially radial, as shown in the drawings) while the other or trailing side is a gradual cam. The disk 936 also carries a laterally projecting pin 938 arranged to cooperate with the lower edge 939 of the lever 912.

When the parts are in normal rest position, they are arranged as indicated in Fig. 10, with the nose 915 of the lever 912 held by the lug 916, with the nose 935 of the two-armed lever 920 dropped in the notch 937 of the disk 936, with the member 923 withdrawn forwardly and downwardly so that it does not press against the plunger 906, and the switch 905 is open.

When the control shaft 823 is turned (by pressing the trip bar 875) to start a cycle of operation, this swings the arms 917 and withdraws the lug 916 from beneath the nose 915, so that the spring 914 turns the lever 912 in a counterclockwise direction around its pivot 913. The shoulder 931 of the lever 912, pressing against the stud 930, forces the member 920 to turn correspondingly in a counterclockwise direction, which moves the stud 921 rearwardly and causes the member 923 to move rearwardly, pressing it against the switch plunger 906 and closing the switch so that the motor starts approximately simultaneously with the engagement of the clutch members 815, 818, etc. Since the motor is just starting at the time that the clutch is engaged, a smooth start of the cycle of operation is achieved, without the sudden jar or shock which would be caused by closing the clutch with the motor already running at high speed. If the range of movement of the stud 921 is somewhat greater than that necessary to close the switch 905 (as is preferably the case to assure complete closing) the stud 921, normally held at the rear end of the slot 922 by the spring 925, may move forwardly through part of the length of the slot 922, without damage to the parts and without excessive pressure on the switch plunger 906.

After approximately half of the cycle of operation, the parts assume the position shown in Fig. 11, with the switch still closed. The notch 937 in the disk 936 has now moved away from the nose 935, and the nose rides on the concentric periphery of the disk, which will thus maintain the switch closed until the notch 937 once more comes around to the nose 935, even though the lever 912 be meanwhile restored to its initial position.

A little before the end of the cycle of operation, the pin 938 on the disk 936 moves against the edge 939 of the lever 912 and cams this lever up to its initial elevated position with the nose 915 above the lug 916, as shown in Fig. 12. This permits the lug 916 to snap back under the nose 915, and then when the pin 938 moves on beyond the lever 912, the nose 915 comes to rest on the top of the lug 916.

When the pin 938 raises the lever 912, the switch is not opened, because the nose 935 of the member 920 is riding at this time on the circular part of the periphery of the disk 936, which prevents the lever 920 from moving back to switch-opening position even though the shoulder 931 has been withdrawn from the stud 930. A moment later, just about the time that the clutch 815, 818 is being opened by contact of the lug 821 with the member 822, the steep side of the notch 937 comes around to the nose 935 and the nose drops suddenly into the notch under the influence of the spring 932, withdrawing the plunger operating member 923 and allowing the switch plunger 906 to move to its open position, stopping the motor.

The centrifugal governor switch above referred to may be constructed as best shown in Figs. 2, 4, and 5. The armature shaft 806 of the motor is provided at its end with a key 945 (Fig. 5) fitting into a complementary notch in a sleeve 946 pinned to the governor stub shaft 947 axially alined with the armature shaft 806. On this shaft 947 is mounted a disk 948, on which a diametrically arranged resilient arm 949 is secured at 950 near one periphery of the disk. Near its opposite end, the arm 949 carries a weight 951, the main mass of which is offset so as to lie to the left of the arm when viewed as in Fig. 5, projecting loosely through a notch in the disk 948 to extend leftwardly beyond the plane of the disk. Near the center of the arm 949 is riveted a metal socket 952 in which is secured a plug 953 of insulating material, which extends through a central hole in the fixed insulating plate 958.

As the governor rotates rapidly, centrifugal force will cause the weight 951 to tend to move to the right when viewed as in Fig. 5. This will move the plug 953 to the right, axially of the armature shaft 806, and will press it against a projection 955 on the end of a T-shaped arm 956 loosely mounted on two headed studs 957 on a fixed insulating plate 958 so as to be capable of some movement thereon. A second arm 959 is secured to the arm 956 by two screws 960 which extend through holes in the arm 959 and are threaded into the arm 956. Between these two screws, one of the arms, preferably the arm 959, is provided with a projection 961 forming a fulcrum bearing against the other arm. By loosening one of the screws 960 and tightening the other, the remote ends of the arms 956 and 959 can be moved closer to or farther away from each other, thus varying the distance between the projection 955 and a corresponding projection 963 on the arm 959 opposite the projection 955 and in alinement with the rotary axis of the armature shaft 806 and the governor shaft 947, in order to vary the speed at which the switch will open.

A metal piece 965 (Figs. 2 and 4) mounted on the insulating disk 958 carries one end of a resilient metal switch arm 966, secured to the piece 965 by nuts on studs 967. The switch arm extends substantially diametrically across the insulating disk 958 and overlies the projection 963 on the arm 959. The free end of the arm 966 carries a contact point 970 which overlies a similar contact point fixed to another metal piece 971 held to the insulating disk 958 by nuts on the studs 972, and spaced from the piece 965. The wire 907 is connected to the piece 965, while the wires 908 and 909 are connected to the piece 971.

The metal pieces 965 and 971 are insulated by bushings from the studs 967 and 972 on which they are respectively mounted. The insulating plate 958 is supported by these studs 967 and 972 from the metal plate 973, which is detachably held to the side frame plate 802 by screws 974. The stub shaft 947 is journalled in the plate 973, so that all of the governor switch parts are carried from the plate 973 and constitute a unitary sub-assembly which may be applied as a unit to the machine, or removed therefrom by removing the screws 974 and disconnecting the electric wires.

When the motor is stationary, or when it is running at less than the predetermined governor cut-out speed, the switch point 970 on the switch arm 966 makes contact with the point on the member 971, thus closing the switch so current may flow directly to the motor (when the switch 905 is also closed) to operate the same. When the motor reaches the predetermined cut-out speed, the resultant centrifugal force moves the plug 953 axially to a sufficient extent to cause the projection 963 to press against the under side of the arm 966 and displace this arm to separate the contact 970 from the corresponding contact on the member 971, thus opening the centrifugal switch and breaking the circuit to the motor except through the condenser 910. The use of this condenser shunted across the centrifugal switch reduces sparking when the switch opens and closes and improves the operation. When the switch opens, the motor slows down until the governor again closes the switch to supply further current to the motor, and thus the governor acts to keep the motor running at substantially a predetermined constant speed, when once it has speeded up at the beginning of a cycle of operation, until the current is cut off at the end of the cycle.

The motor drive mechanism may be enclosed between rearward extensions of the side casing plates 650 (Fig. 1) of the machine, and a special rear casing plate 980 (Fig. 3). A supplementary cup-shaped plate 981 (Fig. 1) may enclose the centrifugal governor, the parts of which project laterally outwardly beyond the plates 650 at the left side of the machine. A similar supplementary cup-shaped member 982 may enclose the rightwardly projecting end of the armature shaft 806, which end is provided with a knob 983 so that, when the casing plate 982 is removed, the knob may be grasped between the thumb and fingers in order to turn the machine manually through its cycle of operation if desired, as, for example, when adjusting or repairing the mechanism.

The motor drive unit constitutes an integral sub-assembly which can be separately assembled and then applied as a unit to the check writing part of the machine, and which can be bodily removed as a unit from the check writing part when adjustment or repair is necessary. The sides of the motor drive unit are formed by the frame plates 801 and 802, rigidly connected to each other and to the intermediate frame plate 919 by the cross rod 830. The metal frame of the motor 805 also constitutes a rigid connection between the frame plate 801 and an intermediate plate 990, while the latter, in turn, is rigidly screwed to offset ears 991 (Figs. 3 and 10) on the plate 919 and rigidly secured to the plate 802 by the fixed transverse posts 993, 994, and 995 (Figs. 10 and 11). The left end of the cross shaft 845 extends through the motor drive frame plate 802 as well as the left plate 30, and both ends of the cross shaft 846 extend through the plates 801 and 802 as well as both plates 30, to assist in holding the drive unit in place relatively to the writing unit.

All parts of the motor drive unit are mounted on or carried from these frame plates and other fixed parts mentioned. The frame plates 801 and 802 of the drive unit are detachably secured to the frame plates 30 of the check writing unit by suitable screws such as those shown at 996, 997, and 998 in Fig. 15. When such screws are removed, and when the rods 845 and 846 are removed axially and the spring 892 (Fig. 15) is unhooked from the push rod 880, then the motor drive unit will be disconnected from the check writing unit and may be removed therefrom. During removal, the gear segment 842 will unmesh from the pinion 850 and come away with the drive unit, or if preferred the connecting rod 841 may be disconnected from the crank 840, thus freeing the gear segment 842 from the drive unit.

The operation of each individual part of the motor drive mechanism has been described above. It is sufficient now to summarize briefly by saying that after the proper keys 40 have been depressed to determine the amount to be printed on the check, and after the check has been properly inserted in the machine, the operator depresses the trip bar 875. This causes the bar 880 to push rearwardly on the stud 881, turning the control shaft 823, thus releasing the lever 912 to close the electric switch 905, and simultaneously releasing the clutch member 821 to move the clutch dog 818 to effective driving position. The electric motor 805 starts, turning the shaft 814 because the clutch is engaged, and the crank 840 on this shaft operates the gear segment 842 to oscillate the main shaft 250, first in one direction and then in the other, to operate the parts of the check writing machine in the same way as in said Payne Patent 2,092,852.

While the cycle of operation is in progress, the stud 871 positioned close behind the lever 867 prevents rearward movement of this lever and thus prevents forward movement of the lower ends of the key locking levers 307, so that all keys are locked until the cycle is substantially completed. Conversely, if any key 40 is not either fully released or fully depressed when the operating cycle starts, the shoulder 870 will lie in the path of the stud 871, preventing substantial upward movement of this stud and causing the roller 858 to ride out of its notch 857, breaking the connection between the motor drive and the type setting mechanism so that the printing types 82 will not be set to the printing line and no amount will be printed on the check (except the zeros in the three lowest denominations, which are always set to the printing line when no other numerals are to be printed in these denominations, and the prefix character, dollar sign, etc.).

At the completion of the cycle of operation, corresponding to one full revolution of the shaft 814, the nose 935 drops into the notch 937, thus opening the switch 905 to stop the motor. At substantially the same instant, the arm 822 stops the clutch member 821, thus releasing the clutch dog 818 to disengage the clutch, so that the shaft 814 will always stop in the same position even if the motor turns over a few revolutions after the switch is opened, due to momentum.

Even though the operator keeps the trip bar 875 depressed throughout the operating cycle, the machine will not repeat the cycle a second time until the trip bar has been released and again depressed. During the cycle, if the trip bar is kept depressed the eccentric pin 885 will shift the member 889 to raise the pusher bar 880 above the stud 881, so the shaft 823 may return to its normal position to open the switch and disengage the clutch at the end of the cycle.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A motor drive unit for application to a printing unit of the type having a main operating shaft requiring to be oscillated to operate the printing unit, said drive unit including an electric motor, a switch for controlling said motor, a crankshaft, a crank on said crankshaft, means operatively connecting said crank to said main shaft to oscillate said main shaft upon rotation of said crank, clutch means for operatively connecting said crankshaft to and disconnecting it from said motor, a control shaft, a member mounted on said control shaft for controlling said switch, a second member mounted on said control shaft for controlling said clutch means, and means for moving said control shaft to close said switch to start said motor and concomitantly to operate said clutch means to cause said motor to drive said crankshaft.

2. A motor drive unit for application to a printing unit of the type having two spaced frame plates approximately parallel to each other and a main operating shaft requiring to be oscillated to operate the printing unit, said drive unit including, in combination, two frame plates spaced from and approximately parallel to each other for attachment to said frame plates of said printing unit to form extensions thereof, an electric motor mounted between said drive unit frame plates, a clutch shaft supported from said drive unit frame plates, means including an engageable and disengageable clutch for operatively connecting said motor to and disconnecting it from said clutch shaft, motor controlling switch mechanism supported from said drive unit frame plates, crank means on said clutch shaft, a gear segment, link means connecting said gear segment to said crank means to oscillate said segment upon rotation of said crank means, and gear means secured to said main operating shaft and meshing with said segment to oscillate said main operating shaft upon oscillation of said segment.

3. The combination of a printing machine including two spaced and substantially parallel main frame plates, and a main operating shaft extending between said plates, and a motor drive unit including two spaced and substantially parallel sub-frame plates overlapping said main frame plates and forming continuations thereof, means rigidly connecting said sub-frame plates to each other independently of said main frame plates to form a unitary sub-frame for the motor drive unit, electric motor means mounted on said sub-frame, a drive shaft mounted on said sub-frame and arranged approximately parallel to said main shaft, clutch means including a driven element secured to said drive shaft and a driving element rotatable on said drive shaft, speed reducing gear transmission means connecting said motor to said driving element, electric switch mechanism mounted on said sub-frame for controlling said motor, a control shaft mounted on said sub-frame, means carried by said control shaft for controlling said switch mechanism, other means carried by said control shaft for controlling said clutch means, means including a trip member mounted on said printing machine for turning said control shaft to operate said switch mechanism to start said motor and concomitantly to operate said clutch means to cause said driving element to drive said driven element to rotate said drive shaft, means for operating said switch mechanism to stop said motor and for concomitantly operating said clutch means to release said driving element from said driven element at a predetermined point in the rotation of said drive shaft, and means operatively connecting said drive shaft to said main shaft to turn said main shaft upon rotation of said drive shaft.

4. A construction as described in claim 3, in which said means for connecting said drive shaft to said main shaft includes a gear fixed to said main shaft, a gear segment meshing therewith, crank means on said drive shaft, and link means connecting said crank means to said gear segment to oscillate said segment upon rotation of said crank means.

5. Motor drive mechanism for printing machines and the like, including an electric motor, a switch for controlling said motor, spring means tending to close said switch to start said motor, clutch means including a driving part operatively connected to said motor and a driven part to be driven by said driving part when said clutch means is engaged, spring means tending to engage said clutch means, a rotatable control shaft, an arm on said shaft normally cooperating with said first mentioned spring means to prevent said means from closing said switch, means on said shaft normally cooperating with said second mentioned spring means to prevent said means from engaging said clutch, and means for turning said shaft from normal position to move said arm so that said first mentioned spring means may close said switch and to move said means on said shaft so that said second mentioned spring means may engage said clutch.

6. Motor drive mechanism for printing machines and the like, including an electric motor, a switch for controlling said motor, a movable switch actuating member, a second movable member, cooperating parts on said actuating member and said second member so arranged that movement of said second member in one direction to a predetermined position causes said actuating member to be correspondingly moved to a predetermined position in which said switch is closed, spring means tending to move said second member to said predetermined position to close said switch to start said motor, releasable means for holding said second member against switch-closing movement, means driven by said motor when said switch has been closed for restoring said second member to non-switch-closing position, and means for holding said actuating member in switch closing position until said motor has completed a predetermined cycle, notwithstanding said restoring of said second member, and for moving said actuating member to switch opening position upon the completion of said cycle.

7. Motor drive mechanism for printing machines and the like, including an electric motor, a switch for controlling said motor, a movable member operatively connected to said switch to close said switch when said member moves in one direction, spring means tending to move said member in switch closing direction to close said switch to start said motor, releasable latch means for holding said member against switch closing movement, cam means moved by said motor and effective to hold said switch closed until the end of a predetermined cycle of movement, means carried by said cam means for restoring said member to initial position before the end of said cycle, and spring means for opening said switch at the completion of said cycle.

8. In a printing machine or the like, the combination of a driving motor, a shaft, a driven clutch element secured to said shaft, a driving clutch element rotatably mounted on said shaft, means for driving said driving clutch element from said motor, a movable clutch control member effective when in one position to disengage said clutch at a predetermined point in its revolution and to maintain it disengaged, resilient means tending to maintain said member in clutch disengaging position, said clutch control member including an abutment, a movable link normally alined with said abutment and movable to cooperate therewith to exert pressure thereagainst to shift said member away from clutch disengaging position, eccentric means carried by said shaft, and lever means operated by said eccentric means during rotation of said shaft to displace said link laterally to a position out of alinement with said abutment so that said spring means may return said clutch control member to its clutch disengaging position.

9. A printing machine or the like, including a shaft, a motor for driving said shaft, means for controlling the driving of said shaft from said motor, said control means including a movable member and an abutment thereon, means for operating said control means to initiate driving of said shaft, said operating means including a thrust member for thrusting against said abutment to move said movable member, a pivoted lever having a slot therein, an eccentric pin on said shaft engaging said slot to swing said lever as said shaft turns, and a second lever pivotally mounted on said first mentioned lever and extending therefrom toward said thrust member into cooperation therewith and so arranged that when said thrust member is in effective position thrusting against said abutment, swinging of said first lever by rotation of said shaft will cause said second lever to displace said thrust member laterally to a position out of alinement with said abutment.

WALTER B. PAYNE.